(12) United States Patent
Porat et al.

(10) Patent No.: US 9,419,996 B2
(45) Date of Patent: Aug. 16, 2016

(54) DETECTION AND PREVENTION FOR MALICIOUS THREATS

(71) Applicant: Shine Security Ltd., Herzlia Pituach (IL)

(72) Inventors: Ron Porat, RaAnana (IL); Andrey Bayora, Nahariya (IL); Oren Farage, Ramat-Gan (IL); Alon Blayer-Gat, Kiryat-Ono (IL)

(73) Assignee: Shine Security Ltd., Herzlia Pituach (IL)

( * ) Notice: Subject to any disclaimer, the term of this patent is extended or adjusted under 35 U.S.C. 154(b) by 0 days.

(21) Appl. No.: 14/397,525

(22) PCT Filed: May 1, 2013

(86) PCT No.: PCT/IL2013/050366
§ 371 (c)(1),
(2) Date: Oct. 28, 2014

(87) PCT Pub. No.: WO2013/164821
PCT Pub. Date: Nov. 7, 2013

(65) Prior Publication Data
US 2015/0135262 A1    May 14, 2015

(30) Foreign Application Priority Data
May 3, 2012 (IL) .......................... 219597

(51) Int. Cl.
G06F 17/00 (2006.01)
H04L 29/06 (2006.01)
(Continued)

(52) U.S. Cl.
CPC ............ H04L 63/145 (2013.01); G06F 21/552 (2013.01); G06F 21/566 (2013.01);
(Continued)

(58) Field of Classification Search
CPC ......... G06F 12/14; G06F 21/50; G06F 21/55; G06F 21/552; G06F 21/554; G06F 21/556; G06F 21/566; G06F 21/577; H04L 29/06; H04L 63/14; H04L 63/1416; H04L 63/145; H04W 12/00
See application file for complete search history.

(56) References Cited

U.S. PATENT DOCUMENTS 6,487,666 B1 * 11/2002 Shanklin ................. G06F 21/55
                                                            709/224
6,973,577 B1    12/2005 Kouznetsov
(Continued)

FOREIGN PATENT DOCUMENTS

CH          704395       7/2012
TW          201135619    10/2011
(Continued)

OTHER PUBLICATIONS

International Preliminary Report on Patentability Dated Nov. 13, 2014 From the International Bureau of WIPO Re. Application No. PCT/IL2013/050366.
(Continued)

Primary Examiner — Jayesh Jhaveri

(57) ABSTRACT

A method of identifying one or more malicious threats in a computing device. The device comprises monitoring a plurality of events occurring on a computing device in run time, a plurality of processes executed on the computing device in run time, and a plurality of host activities of the computing device in run time, identifying a compliance of at least some of the plurality of events, the plurality of processes, and the plurality of host activities with a plurality of rules, generating a rule compliance status dataset generated according to the compliance, identifying a match between the rule compliance status dataset and at least one of a plurality of reference profiles each indicative of a computing device operation under a malicious threat activity, and detecting a malicious threat according to the match.

23 Claims, 8 Drawing Sheets

(51) Int. Cl.
*G06F 21/56* (2013.01)
*G06F 21/55* (2013.01)
*G06F 12/14* (2006.01)
*G06F 21/50* (2013.01)
*G06F 21/57* (2013.01)

(52) U.S. Cl.
CPC ............... *G06F 12/14* (2013.01); *G06F 21/50* (2013.01); *G06F 21/55* (2013.01); *G06F 21/554* (2013.01); *G06F 21/556* (2013.01); *G06F 21/577* (2013.01); *H04L 29/06* (2013.01); *H04L 63/14* (2013.01); *H04L 63/1416* (2013.01)

(56) References Cited

U.S. PATENT DOCUMENTS

| | | | |
|---|---|---|---|
| 7,540,013 B2 | 5/2009 | Freund | |
| 7,568,233 B1* | 7/2009 | Szor | G06F 21/564 726/22 |
| 7,694,150 B1 | 4/2010 | Kirby | |
| 8,065,728 B2 | 11/2011 | Wang et al. | |
| 8,490,195 B1* | 7/2013 | Chen | G06F 12/14 705/51 |
| 8,555,385 B1* | 10/2013 | Bhatkar | G06F 21/556 726/22 |
| 8,627,458 B2* | 1/2014 | Muttik | G06F 21/55 726/22 |
| 2001/0037264 A1 | 11/2001 | Husemann et al. | |
| 2004/0187023 A1* | 9/2004 | Alagna | G06F 21/56 726/24 |
| 2006/0242705 A1* | 10/2006 | Sadhasivam | H04L 63/145 726/23 |
| 2006/0265746 A1* | 11/2006 | Farley | G06F 21/577 726/22 |
| 2007/0192866 A1* | 8/2007 | Sagoo | G06F 21/55 726/24 |
| 2007/0240215 A1* | 10/2007 | Flores | G06F 21/55 726/24 |
| 2008/0271143 A1* | 10/2008 | Stephens | H04L 41/5061 726/22 |
| 2010/0082803 A1 | 4/2010 | Nguyen | |
| 2010/0107249 A1 | 4/2010 | Krig | |
| 2010/0132038 A1 | 5/2010 | Zaitsev | |
| 2010/0306850 A1* | 12/2010 | Barile | G06F 21/577 726/25 |
| 2011/0023115 A1* | 1/2011 | Wright | G06F 21/552 726/22 |
| 2011/0035302 A1 | 2/2011 | Martell et al. | |
| 2011/0099107 A1 | 4/2011 | Saxena et al. | |
| 2011/0167494 A1 | 7/2011 | Bowen et al. | |
| 2012/0215690 A1 | 8/2012 | Grinberg et al. | |
| 2013/0298244 A1* | 11/2013 | Kumar | G06F 21/52 726/25 |
| 2014/0199664 A1* | 7/2014 | Sadeh-Koniecpol | G09B 5/00 434/118 |

FOREIGN PATENT DOCUMENTS

| | | |
|---|---|---|
| WO | WO 00/67177 | 11/2000 |
| WO | WO 03/005273 | 1/2003 |
| WO | WO 2008/083022 | 7/2008 |
| WO | WO 2009/091722 | 7/2009 |
| WO | WO 2012/067993 | 5/2012 |
| WO | WO 2012/115873 | 8/2012 |
| WO | WO 2013/164821 | 11/2013 |

OTHER PUBLICATIONS

International Search Report and the Written Opinion Dated Oct. 18, 2013 From the International Searching Authority Re. Application No. PCT/IL2013/050366.

Invitation to Pay Additional Fees Dated Aug. 8, 2013 From the International Searching Authority Re. Application No. PCT/IL2013/050366.

Baker "New App Transfers Money With the Tap of a Phone", Reuters, Toronto, 3 p., Apr. 9, 2012.

Freeman "QR Codes, Mobile Payments Especially Popular for Food Businesses", Mashable, Sep. 11, 2012.

Smith "Barclays Opens Up PingIt Money Transfer App Up to Everyone. App Makes It Easy to Send Cash and Receive Regardless of Who You Bank With", TechRadar Network, Apr. 12, 2012.

Office Action Dated Sep. 1, 2015 From the Israel Patent Office Re. Application No. 219597 and Its Translation Into English.

\* cited by examiner

US 9,419,996 B2

DETECTION AND PREVENTION FOR MALICIOUS THREATS

RELATED APPLICATIONS

This application is a National Phase of PCT Patent Application No. PCT/IL2013/050366 having International filing date of May 1, 2013, which claims the benefit of priority of Israel Patent Application No. 219597 filed on May 3, 2012. The contents of the above applications are all incorporated by reference as if fully set forth herein in their entirety.

BACKGROUND

The present invention, in some embodiments thereof, relates to malicious activity detection and/or prevention and, more specifically, but not exclusively, to systems and methods of malicious activity detection and/or prevention based on host and/or environment parameters monitoring.

Conventional anti-virus (AV) applications attempt to prevent harmful or malicious transmissions such as viruses and worms from infiltrating a computing device. Typically, such applications operate on a network gateway or host and monitor incoming traffic. Conventional AV applications, whether server or host based typically rely on a so-called fingerprint matching implementation. Such a fingerprint matching mechanism aggregates a set of unique indicators, or signatures, exhibited by known malicious transmissions. The unique indicators typically represent portions of files which a particular AV vendor has previously identified as malicious, such as a signature extracted from a particular byte range in the file, or a hash computed over a predetermined portion of a file. The result is a signature value substantially shorter that the entity (file) it represents yet which has a high likelihood of matching a signature computed from another similar instance of the file. A set of signatures of known malicious transmissions is readily comparable to an incoming transmission to determine malicious content in the incoming transmission.

During the last years system and methods for integration of behavioral and signature based security have been developed. For example, U.S. Pat. No. 7,694,150 describes a behavioral based (subject) approach addresses the so-called "day zero" problem of object matching approaches. An integrated approach combines the behavioral remedy against unknown transmissions with the signature matching of known harmful transmission to provide the reliability and stability of signature based approaches with the real time responsiveness of the behavioral approach. A behavior monitoring module analyzes actions via behavioral heuristics indicative of actions performed by known harmful transmissions. The behavioral monitoring correlates the actions performed to determine an undesirable object. A signature generator computes a real time signature on the suspect object. The signature generator accumulates successive real time signatures in this manner for comparison with subsequent incoming transmissions, thus combining the subject based behavioral aspects of virus detection with the deterministic aspects of the object approach.

SUMMARY

According to some embodiments of the present invention there is provided a method of identifying one or more malicious threats in a computing device. The method to comprises monitoring a plurality of events occurring on a computing device in run time, a plurality of processes executed on the computing device in run time, and a plurality of host activities of the computing device in run time, identifying a compliance of at least some of the plurality of events, the plurality of processes, and the plurality of host activities with a plurality of rules, generating a rule compliance status dataset generated according to the compliance, identifying a match between the rule compliance status dataset and at least one of a plurality of reference profiles each indicative of a computing device operation under a malicious threat activity, and detecting a malicious threat according to the match.

Optionally, the monitoring comprises identifying the plurality of processes by correlating among the plurality of events.

Optionally, method further comprises identifying the plurality of host activities by correlating among the plurality of processes.

Optionally, the method further comprises scoring at least some of the plurality of events, at least some of the plurality of processes, and at least some of the plurality of host activities and detecting the malware according to a combination of an outcome of the scoring and the match.

Optionally, the monitoring comprises normalizing the plurality of events.

Optionally, the monitoring comprises filtering a group of unmalicious events from the plurality of events according to unmalicious event dataset comprising a plurality of event profiles generated according to a statistical analysis of a plurality of event logs recorded in a plurality of computing devices.

Optionally, the identifying a compliance comprises identifying an event compliance of the plurality of events with a plurality of event level rules, a process compliance of the plurality of processes with a plurality of process level rules, and a host activity compliance of the plurality of host activities with a plurality of host activity level rules.

More optionally, the generating comprises combining between data indicative of the event compliance, data indicative of the process compliance and data indicative of the host activity compliance.

More optionally, the event compliance is performed by analyzing a compliance of a sequence from the plurality of events according to at least one of the plurality of to event level rules.

Optionally, the monitoring comprises classifying the plurality of events and counting the plurality of events in light of the classification, the compliance is checked according to the counting.

Optionally, the generating comprises calculating a similarity of the match, the detecting is performed according to the similarity score.

Optionally, the method further comprises scoring a threat level of at least some of the plurality of host activities; the detecting is performed according to a combination of the scoring and the similarity score.

Optionally, the rule compliance status dataset is a binary dataset wherein each field is indicative of compliance or noncompliance with another of the plurality of rules.

Optionally, the plurality of events comprises a plurality of kernel level events.

Optionally, monitoring comprises documenting the plurality of events in an event log, the plurality of host activities is generated from an analysis of the event log.

Optionally, the rule compliance status dataset is a floating point dataset wherein each field is indicative of the measure of compliance or noncompliance with another of the plurality of rules.

Optionally, the method further comprises iteratively repeating the method to update the rule compliance status dataset during a period of at least a month.

Optionally, the method further comprises iteratively repeating the method to update the rule compliance status dataset during any period of time.

Optionally, the detecting comprises outputting a notification according to the match.

Optionally, the method further comprises classifying at least one member of a groups consisting of: the plurality of events, the plurality of processes, and the plurality of host activities, sending data pertaining to the at least one member to inspection by a central unit.

According to some embodiments of the present invention there is provided a method of identifying one or more malicious threats in a computing device. The method to comprises monitoring a plurality of events occurring on a computing device in run time, calculating an event score indicative of a threat level to each of at least some of the plurality of events, identifying a plurality of processes executed on the computing device each related to a group of events from the plurality of events and calculating a process score to each the process by aggregating respective event scores of a respective the group of events, identifying a plurality of host activities of the computing device each related to a group of processes from the plurality of events and scoring each the host activity by aggregating respective process scores of a respective the group of processes, and detecting a malware if at least one of the process event, process scores, and one or more data activity scores exceeds respective one or more score thresholds.

Optionally, the method further comprises identifying a plurality of environment activities of a computing device environment comprising the computing device each the environment activity being related to a group of host activities from a plurality of computing devices in the computing device environment and scoring each the environment activity by aggregating respective host activity scores of a respective the group of host activities.

According to some embodiments of the present invention there is provided a method of identifying a malware profile. The method comprises generating a rule compliance status dataset for each of a plurality of computing devices in run time, each the rule compliance status dataset being generated according to a compliance of events, processes, and host activities of one of the plurality of computing devices with a plurality of rules, the events, processes, and host activities being gathered during a period of at least one month, scoring a threat level of each the computing device in run time according to a classification of at least some of the events, processes, and host activities, and extracting a malware profile from respective the respective rule compliance status datasets of a group of the plurality of computing devices if a respective the threat level of at least one member of the group is above a threshold.

According to some embodiments of the present invention there is provided a system of identifying one or more malicious threats. The system comprises a plurality of monitoring modules installed in a plurality of computing devices, each the monitoring module is set to monitor a plurality of events, a plurality of processes and a plurality of host activities of a respective hosting the computing device in run time, to check to compliance of the plurality of events, the plurality of processes and the plurality of host activities with a plurality of rules, to generate a rule compliance status dataset according to the compliance, and to detect a malicious threat activity according to a match between the rule compliance status dataset and at least one of a plurality of reference profiles in a profile repository and a central unit which receives, via network, a plurality of rule compliance status datasets including the rule compliance status dataset from the plurality of monitoring modules and updates the profiles accordingly.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
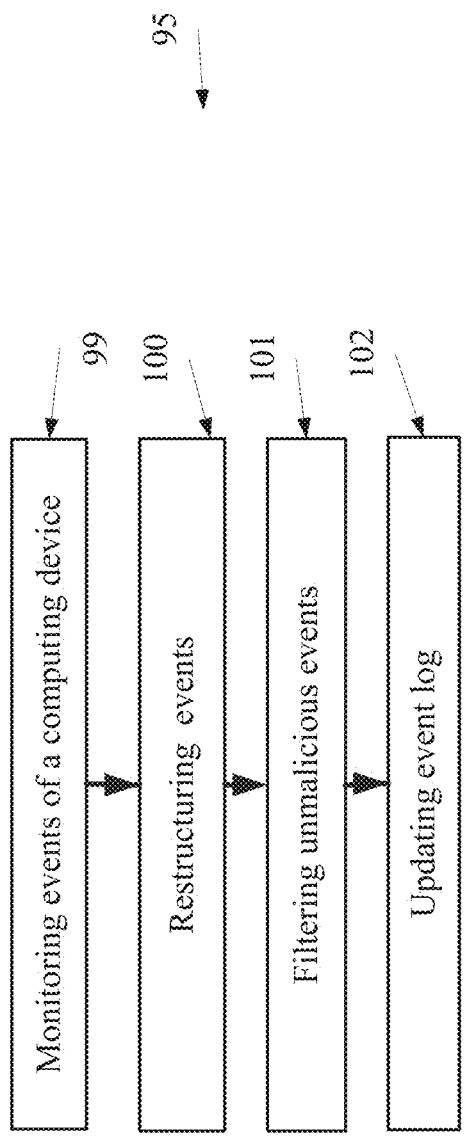
FIGS. 1 and 2 are flowcharts of a method of identifying one or more malicious threats, also referred to as malwares, in a computing device by an analysis of events, processes, computing device activities, and/or environment activities, according to some embodiments of the present invention.

The present invention, in some embodiments thereof, relates to malicious activity detection and/or prevention and, more specifically, but not exclusively, to systems and methods of malicious activity detection and/or prevention based on host and/or environment parameters monitoring.

According to some embodiments of the present invention, there are provided methods and systems of identifying one or more malicious threats in a computing device by monitoring events in run time, correlating the events to identify processes, host activities and/or computing environment activities, and verifying the compliance of the events, processes, host activities, and/or environment activities with a set of rules and/or learnt behavior. The events may be monitored during a period of more than few hours, for example days, weeks, months, and/or years, optionally in the kernel and/or operating system (OS) level. Optionally, a dataset indicative of rule compliance, for example a vector which for brevity includes one or more descriptors and/or one or more feature vectors, is generated per computing device and matched with malware and/or normal operation profiles to calculate a threat level. Optionally, a threat level is calculated according to the similarity of the dataset to the malware and/or normal operation profiles.

Optionally, events, processes, host activities, and/or environment activities are scored according to the classification thereof. Optionally, when an event, process and/or to activity of computing device is scored above a certain threshold and/or a combination of thresholds, a malicious threat is detected. Optionally, the scores of the events, processes, host activities, and/or environment activities of a certain computing device are combined the above information about the similarity of the dataset to estimate a threat level.

Optionally, when an event, a process and/or an activity of computing device is scored, one or more malware and/or normal operation profiles are created according to the compliance of events, processes, host activities, and/or environment activities of a cluster of computing devices that includes this computing device.

Optionally, events are filtered according to a match with an event dataset that documents unmalicious events. The event dataset is optionally updated according to a predefined set of criteria, for example: combination of statistical analysis of the computing device, event prevalence, number of occurrences and computing environment.

According to some embodiments of the present invention, there are provided methods and systems of identifying a malicious activity profile by scoring events, processes and/or host activates of a computing device to identify a malware threat in run time and generating a malicious activity profile from rule compliance data and learnt behavior that is gathered from computing devices which have a similar behavior to the computing device. The rule compliance data is optionally locally generated by monitoring events, processes and/or host activates of each computing device.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the to present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming to language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
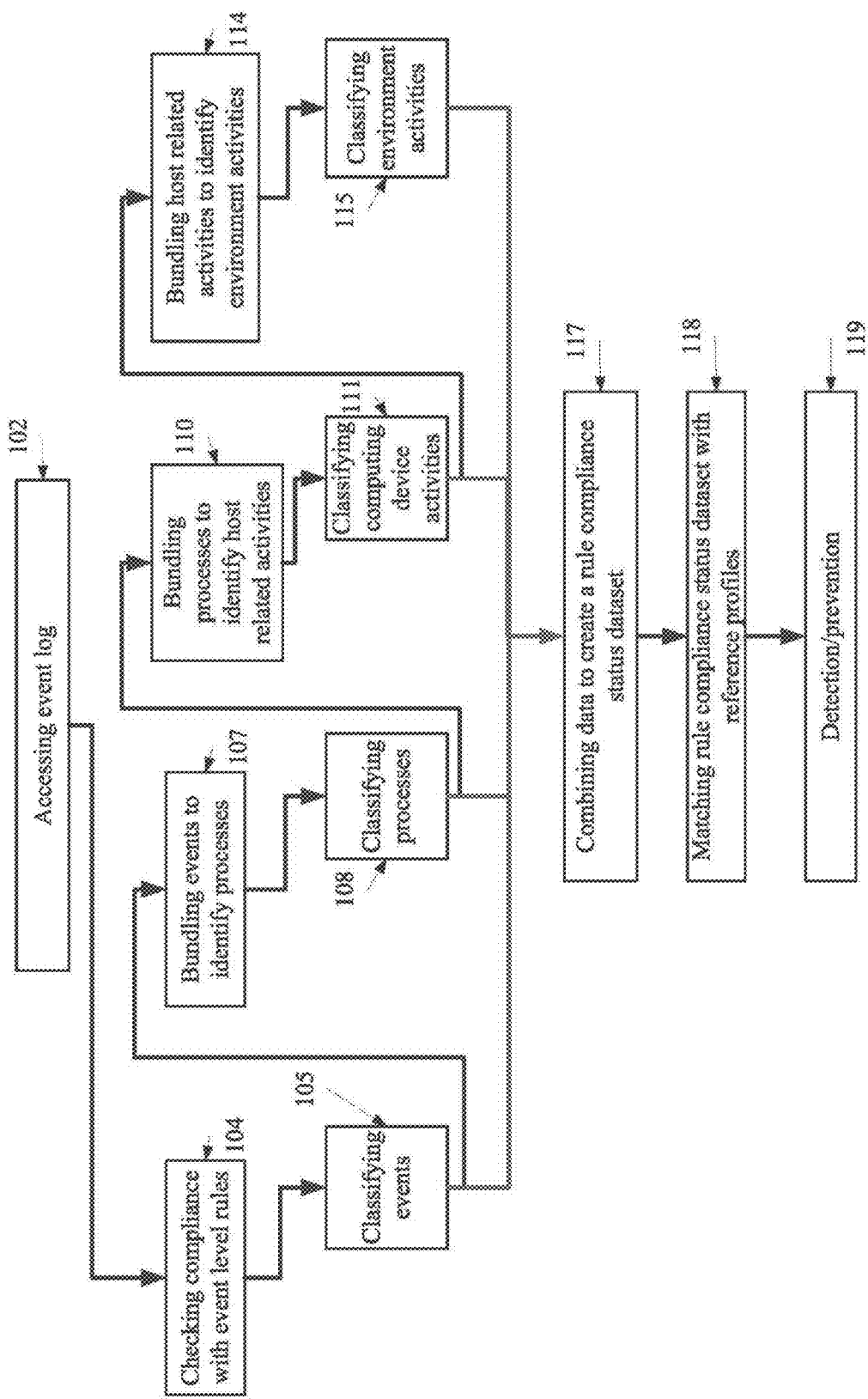

Reference is now made to FIGS. 1 and 2, which are flowcharts of a method of to identifying one or more malicious threats, such as malwares and malicious activities, either human or robotic, in a computing device by an analysis of events, including system calls and/or application program interface (API) calls, processes, computing device activities, and/or environment activities, according to some embodiments of the present invention. The method allows detecting malware(s) in a computing device, such as personal computer, a laptop, a mobile device, such as a Smartphone, a cloud entity, a router, a server, a tablet, and/or any processor based device. As further described below, the method identifies symptoms of a computing device executing a malware, such as a virus, a spyware, a malicious document file, web-based malware, for example a JavaScript and a Flash file and/or a Trojan. As further described below, the abovementioned analysis allows identifying symptoms, anomalies, and/or changes in the computing device which indicate it hosts and/or being attacked by a malware. Optionally, such malware presence indications are identified by detecting a combination of symptoms, anomalies, and/or changes identified in a number of levels from the following: an event processing level, an executed process level, an executed processes groups level, a computing device processing level and/or a computing device performances level. Optionally, a different weight may be given to different symptoms, anomalies, and/or changes.

FIG. 1 depicts a process 95 of continuously monitoring and updating an event log and FIG. 2 depicts a process 98 analyzing events, which are documented in the event log, to detect and/or prevent malware infection at a certain computing device. In run time, the processes are optionally performed iteratively so that the event log is updated with new events and the malware is prevented and/or detected in real time.

Figure 3:
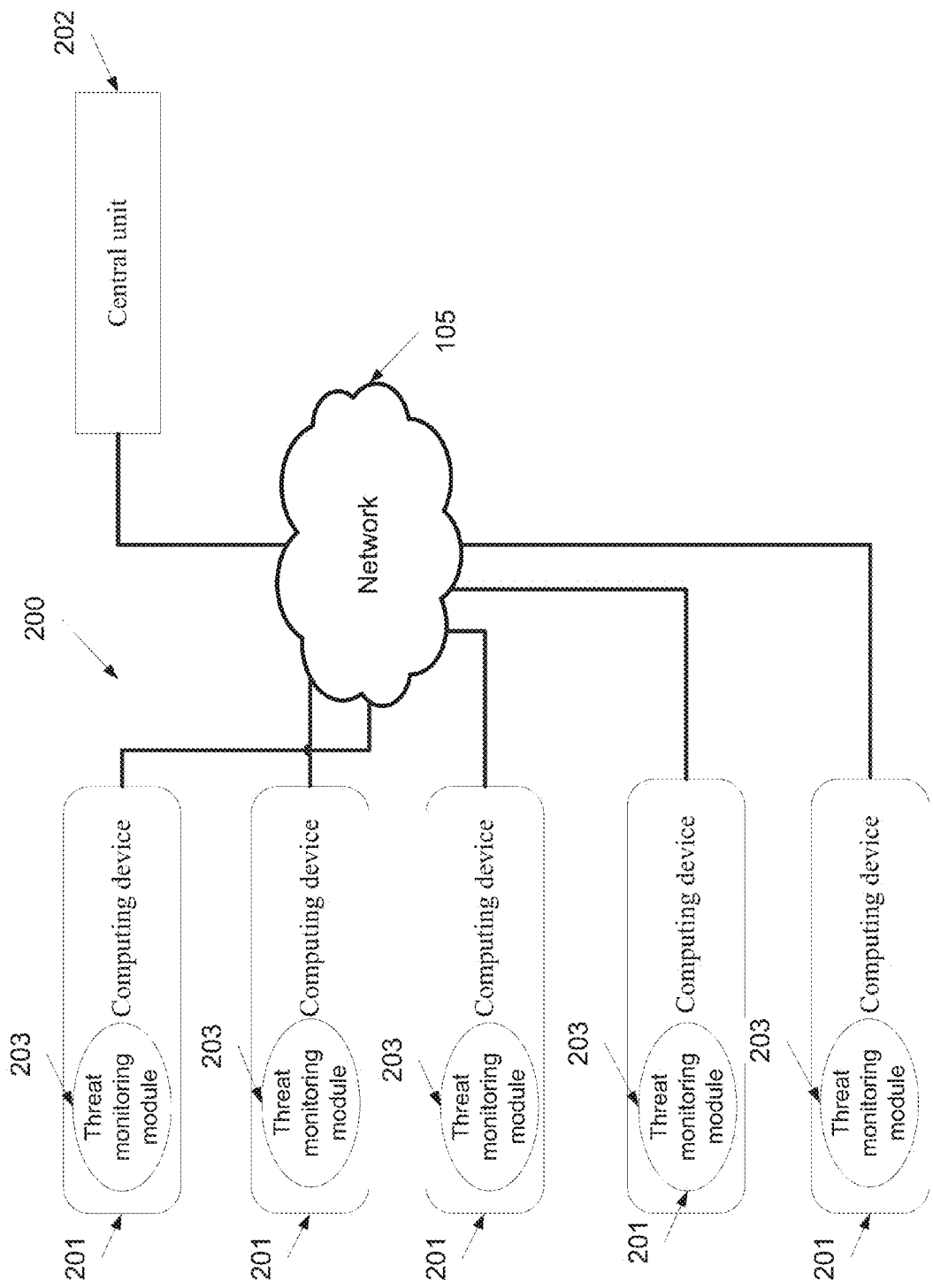
FIG. 3 is a schematic illustration of a system of identifying malicious threat(s) in one or more computing devices, according to some embodiments of the present invention.

Reference is also made to FIG. 3, which is a schematic illustration of a system 200 of identifying one or more malicious threats in one or more computing devices 201, according to some embodiments of the present invention. The system 200 optionally supports the method depicted in FIGS. 1 and 2 when implemented in a plurality of computing devices, optionally in parallel. The system 200 includes a central unit 202, for example one or more server(s) and/or a plurality of malicious threat monitoring modules 203 hosted, either permanently and/or temporarily, in the computing devices 201, according to some embodiments of the present invention. As further described below, the system 200 and method detect, in real time, malware threats, for example advanced to persistent threat (APT) and zero-day attack by identifying anomalies on the computing devices 201. As further described below, the system 200, for example at the central unit 202, may run a learning mechanism that automatically and/or semi automatically profiles behavior of hosting terminal(s). The profiling is optionally performed by accumulating data pertaining to events, processes, hosting/computing terminal activities (also referred to herein as host activities), and/or and environment activities, extracting patterns from the accumulated data, bundling patterns and statistically analyzing the bundled patterns to determine a level of possible threat(s). By learning, unmalicious and/or malicious activities on a certain hosting terminal may be identified based on classification of historical events, processes. Additionally or alternatively, the unmalicious and/or malicious activities may be identified based on classification of activities of the certain hosting terminal itself and/or environment activities occurred in an environment which includes the certain hosting terminal for example in a respective group of terminals of an organization, a division and/or the like. With time, malicious and/or normal operation profiles, which are tailored to a specific hosting terminal, may be identified by monitoring and analyzing pieces of code executed on the specific hosting terminal, as well as additional anomalies.

Reference is now made to FIG. 1. First, as shown at 99, a plurality of events, such as events tracing for windows (ETW), executed at the computing device 201 are monitored, optionally by the malicious threat monitoring module 203. Optionally, the malicious threat monitoring module 203 is designed to channel events generated by the hosting computing device 201 to an event processor which analyzes the events. Optionally, events are channeled from the application program interfaces (APIs) of the operating system (OS) of the hosting computing device 201, for example by utilizing API calls and/or API aggregators. Additionally or alternatively, the malicious threat monitoring module 203 channels events using a kernel driver, optionally, a shadow kernel driver. The kernel driver initiates before the OS is loaded and collects events in the kernel level. Such a kernel driver has a higher priority and more authorizations than a process executed by the OS.

Optionally, as shown at 100, an event data and structure is restructured, for example by a normalization sub module hosted on the hosting computing device 201. Raw data that includes events, for example events tracing for windows data, is collected to and processed into a predefined consolidating structure. Optionally, the restructuring is performed according to one or more normalization rules which define a syntactic conversion. For example, the following ETW event data:

"9:15:19.8204414_PM","Explorer.EXE","460","RegQueryValue","HKL
M\System \CurrentControlSet\Services\Tcpip\Parameters\Interfaces\{0332E2D0-
44F6-4CB4-AD79-B878E2D96128}\EnableDHCP","SUCCESS","Type:
REG_DWORD, Length: 4, Data:
1","Registry","C:\WINDOWS\Explorer.EXE","Ianir-
0190E5B7\Administrator","C:\WINDOWS\Explorer.EXE","1932","Read","18
16","2/12/2012 9:15:19 PM","00:00:00.9003676","0.0000132"

is translated into the following in a predefined structure:

---

"9:15:19.8204414_PM","Explorer.EXE","460","RegQueryValue","HKLM\System\CurrentControlSet\Services\Tcpip\Parameters\Interfaces\{[CLSID]}\EnableDHCP","SUCCESS","Type: REG_DWORD, Length: 4, Data:1","Registry","C:\WINDOWS\Explorer.EXE","ANDREY-0190E5B7\Administrator","C:\WINDOWS\Explorer.EXE","1932","Read","1816","2/12/2012 9:15:19 PM","00:00:00.9003676","0.0000132"

--- according to the following normalization rules:

---

"[id = 1, description: "Rule to normalize path field of the event"]{
class = "Registry", path @ "([A-Za-z0-9]){8}-([A-Za-z0-9]){4}-([A-Za-z0-9]){4}-([A-Za-z0-9]){4}-([A-Za-z0-9]){12}"} -> normalize(replace, path, "[CLSID]")".

---

Optionally, each restructured event is logged as an entry.

Optionally, as shown at 101, events, for example entries, which are identified as unmalicious events, are filtered, also referred to herein as purged, and/or classified as unmalicious events. Optionally, the unmalicious events are identified according to a match with unmalicious event dataset, a structure holding restructured events that were tagged as unmalicious, for example not related to a known attack pattern. The unmalicious event dataset is optionally generated according to statistical information gathered during the run time of the system 200, for example as described below. The tagging of these events may be statistical. Optionally, the tagging is adapted to a certain organization to which respective hosting computing device(s) are related to, the hosting computing device, the user of the hosting computing device, optionally based on cloud service(s) she uses, and/or the division, sub division, market segment, geographical area and/or the like of the hosting computing device. The tagging of these unmalicious events may be dynamic, for example set according to the learning mechanism which is described below. Optionally, events are classified according to their belonging to a certain process, for example according to the process name. The classification to processes may be performed as described herein. Each event that is not matched with a restructured event documented in the unmalicious event dataset is considered as an anomaly and checked as described below. An unmalicious event dataset may include separate restructured events and sequences restructured events, for example a sum of events which are part of the operation of the operating system.

For example, an unmalicious event dataset may include a plurality of entries, each being generated according to a process name, for example according to the following structure:

Process Name, Operation, Path, Result, Event Class, Image Path, User, Command Line, Category Exemplary entries are as follows:

--- lsass.exe RegCloseKey HKLM\SECURITY\Policy SUCCESS Registry C:\WINDOWS\system32\lsass.exe NT AUTHORITY\SYSTEM C:\WINDOWS\system32\lsass.exe (No Category)

svchost.exe RegOpenKey HKLM\Software\Microsoft\COM3 SUCCESS Registry C:\WINDOWS\system32\svchost.exe NT AUTHORITY\NETWORK SERVICE C:\WINDOWS\system32\svchost -k rpcss svchost.exe RegQueryValue HKLM\SOFTWARE\Microsoft\COM3\REGDBVersion SUCCESS Registry C:\WINDOWS\system32\svchost.exe NT AUTHORITY\NETWORK SERVICE C:\WINDOWS\system32\svchost -k rpcss Read

---

Additionally or alternately, events, for example entries, which are not identified as unmalicious events, are classified as potentially malicious events. Optionally, the filtering and/or the classification are performed by the malicious threat monitoring module 203.

Optionally, as shown at 102, potentially malicious events, namely unfiltered events, are added as an entry to an event log. The event log may document events detected during a monitoring period, for example since the initiation of the monitoring and/or during a certain defined period, for example the last 1, 3, 6, 12 and 18 month(s) or any intermediate or longer term. The event log is optionally updated in real time.

Optionally, as shown at 103, the process depicted in 99-102 is iterative in continuously repeated in run time. This allows continuously and/or iteratively performing the process depicted in FIG. 2 based on an up-to-date event log.

Reference is now also made to FIG. 2. Optionally, as shown at 104-105, the unfiltered monitored events, for example the restructured potentially malicious events, for instance from the event log, are probed according to one or more event level rules to detect event level indications of a presence of a malware in the respective hosting computing device. Optionally, each event level rule is defined according to prior expert knowledge of OS internals, known malware operations, and/or statistical analysis of data from a plurality of hosting terminals, for example as described below. For example, an event level rule allows identifying a specific action and/or a deviation of an event from an unmalicious event behavior pattern that occurs during an operation of a computing device that is not infected with a malware.

As shown at 104, events are checked against event level rules. For example, the number of appearances of each event, optionally in a given time frame, is counted, acting as a feature in a feature vector, or a descriptor. This may also be used for identifying malicious and/or unmalicious event. The compliance or the noncompliance of one or more events with a rule is optionally added as a binary outcome to a rule compliance status dataset, for example as depicted in 117 and described below.

Then, as shown at 105, the events are classified. During the classification, events, for example entries of the event log, are optionally tagged. For example, a new attribute, also referred to as a label, is added to the entry as an additional field. Exemplary tags, which may be added to an event, are: AutoStart, System folder, Browser security, Network settings, and/or OS password storage.

Optionally, as shown at 107, the monitored events, for example entries, are bundled and/or correlated to a group of events representing a common process. For brevity, the terms bundling and correlating may be used interchangeability. The bundling may be made based on the above event classification, sliding window protocol event timing, event counts, and/or a total accumulation and classifications. The correlations may be done using different approaches and/or correlation guidelines.

Optionally, the processes are updated according to the updating of the event log.

Optionally, as shown at 108, each process is classified. For example, the following rule may be used for classifying a process:

If counters(classification1, classification2, classification3) then classify("tag1") and skip else reapply;
If counters.last_minuet(classification3)>=100 then classify("tag2") and skip else reapply; and
If counters.last_minuet(classification4)>=50 then classify ("tag3"), reapply.

Optionally, the compliance or the noncompliance of one or more processes with a process rule is optionally added as a binary outcome to the rule compliance status dataset, for example as depicted in 117 and described below.

Optionally, as shown at 110, the processes, which are optionally identified as described above, are bundled to a group of processes representing a host related activity. The bundling may be of processes using the same resource(s), for example memory area and/or central processing unit at a certain time frame, processes which are of the same domain, for example user domain and/or system domain, processes having common resource utilization history, for example CPU utilization history, memory utilization history and/or the like, and/or processes associated with certain user(s).

Optionally, as shown at 111, each host related activity is classified according to host related activity level rules to detect host related activity level indications of a presence of a malware in the computing device. Optionally, each host related activity level rule is defined according to prior expert knowledge of OS internals and/or known malware operations. The classification may be performed as follows:

```
on HOST level rule example
    If counters(classification1, classification2, classification3) then
    classify("tag1");
    skip else reapply
```

Optionally, the compliance or the noncompliance of one or more host activities with a host activity rule is optionally added as a binary outcome to the rule compliance status dataset, for example as depicted in 117 and described below.

Optionally, as shown at 114-116, host related activities from a plurality of hosts and/or related data, referred to herein as host related activities, are analyzed to identify malicious threat indications which are spread in an environment level of a group of hosting terminals.

Optionally, as shown at 114, the host related activities, which are optionally identified as described above, are bundled to groups of activities of hosting computing devices 201 which use common resource(s), have common resource utilization history, have common users and/or groups of the users, and/or share common process(es). Host related activities of hosting computing devices 201 may be also be grouped according to related divisions and/or sub divisions, organizations and/or sub organizations, countries and/or geographical regions, cloud users and/or the like. Computing devices groups may be divided to sub groups. These correlations are done between hosting computing devices 201 in a current state (alive) and/or hosting computing devices with unclassified and terminated events. The correlation may be performed as follows:

Cross correlation rule of resources example {IsCrossReferenceMatch( )=true}->score( )

Optionally, as shown at 115, host related activities of computing devices of a computing devices group are classified according to environment rule(s).

Optionally, the compliance or the noncompliance of one or more related environments with an environment rule is optionally added as a binary outcome to the rule compliance status dataset, for example as depicted in 117.

As shown at 117 and outlined above, the statuses (e.g. true and false) of compliance and/or non compliance with the event level rules, process level rules, host related activity rules and/or the environment rules are combined, for example as a vector or any in another dataset, to create a rule compliance status dataset of the hosting computing device 201. Optionally, each entry of the rule compliance status dataset is indicative of a compliance with one of the event level rules, process level rules, host related activity rules and/or the environment rules and optionally determined according to a give score.

As shown at 118, the rule compliance status dataset may be matched with a database of reference profiles, for example malware and/or normal operation profiles, to classify the rule compliance status dataset. The matching may be local, for example managed by the malicious threat monitoring module 203 and/or performed centrally on the central unit 202.

Figure 4:
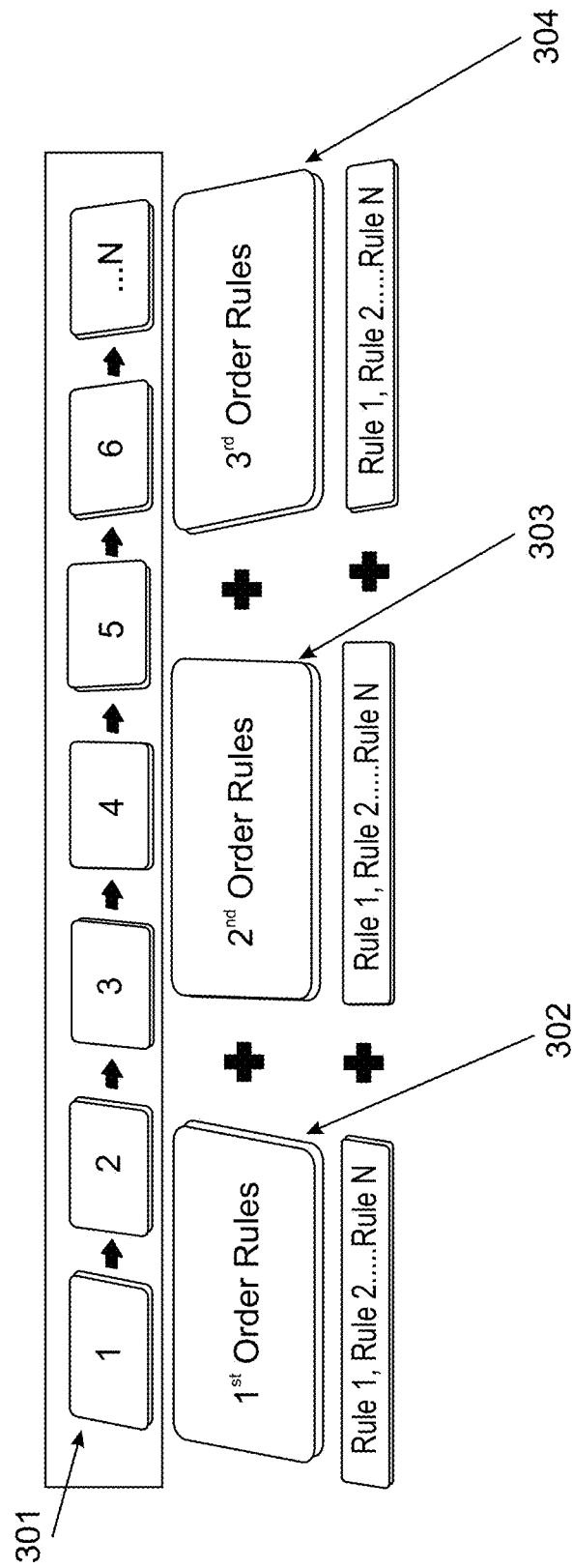
FIG. 4 is a schematic illustration of a rule compliance status dataset according to to some embodiments of the present invention.

For example, reference is now also made to FIG. 4 that is a schematic illustration of a rule compliance status dataset, a vector 301, pertaining to a computing device and generated according to some embodiments of the present invention. The vector 301 is optionally binary wherein each element is 1 or 0, equivalent of true or false. Optionally, the vector includes a number of segments, such as 302-304. Each segment represents compliance with rules of a common type, for example event level rules, process level rules, host related activity rules and/or the environment rules. The segments are optionally ordered from the event level rules to the environment rules. Each segment may be related to or provided as independent binary vectors.

The segments of the vector are based on events monitored in a certain computing device and matched to a set of vectors representing normal operation and/or malware profiles. The matching may be used to identify statistical anomalies.

According to some embodiments of the present invention, the similarity (i.e. distance) of the rule compliance status dataset to each normal operation and/or malware profile is scored, for example between 0 (no similarity) and 1 (full similarity), for instance in percentages. For example, a rule compliance status dataset is matched with normal operation and/or malware profile(s), such as vectors, are classified using a Naïve Bayesian method. For brevity, $S=\{0,1\}^n$ denotes a binary space divided into two subsets malware profiles [bad (B)], normal operation [good (G)] where $\tilde{B}$ and $\tilde{G}$ denote random samples of these subsets and $x \in S$ denotes a vector that does not belong either to $\tilde{B}$ or to $\tilde{G}$. The classification is performed by determining whether the vector (or any other rule compliance status dataset) belongs to B or to G.

When $$b_i = \frac{\sum_{x \in B} x_i}{|B|} \text{ and } g_i = \frac{\sum_{x \in G} x_i}{|G|},$$

the estimated probability of a vector in B to be equal a given vector X is $$L_B(x) = \prod_{i=1}^{n} (x_i b_i + (1-x_i)(1-b_i)).$$

Similarly, the estimated probability of a vector in G to be equal a given vector x is $$L_G(x) = \prod_{i=1}^{n} (x_i g_i + (1-x_i)(1-g_i)).$$

If $L_B(x) > L_G(x)$, the vector is suspected as being a member of B. This estimated probability may be validated under statistical independence assumptions.

Optionally, if n sample is not large enough, it is likely that the estimated probability equals to zero in both sets. This may be the case for vectors x such that $x_i = x_j$ where $b_i = 1$, $b_j = 0$, $p_i = 0$, $p_j = 1$. Optionally, zero or one valued parameters are slightly altered, for example by min $$\left( \frac{0.5}{|G|}, \frac{0.5}{|B|} \right),$$

to avoid such an equation.

Optionally, if $x \in \tilde{B}$ and $x \notin \tilde{G}$, X is set as a member of B and vice versa.

Optionally, classification is performed with a different classification engine, for example, but not limited to Neural Networks, Nearest Neighbor, Boosting, SVM, LDA, Conditional Random Fields, and/or the like.

Based on the above matching, as shown at 119, malwares may be detected. For example, a notification may be outputted and forwarded, for example presented to a system operator and/or a user of the respective computing device. Additionally or alternatively, as shown at 119, malwares may be prevented based on the above matching. For example, a malware blocking and/or removal function(s) may be executed, for example automatically on the respective computing device.

According to some embodiments of the present invention, events, processes, host activities and/or environment activities are scored according to a statistical and/or a deterministic model. For example, reference is now made to FIG. 5, which is a flowchart of a process of detecting and/or preventing malwares based on scores of events, processes, host activities and/or environment activities, according to some embodiments of the present invention. The process is as depicted in FIG. 2; however, as shown at 106, 109, 112, and 116 scores are given to classified events, processes, host activities and/or environment activities.

Optionally, as shown at 106, a deterministic event score indicative of an estimated threat level may be calculated per event, for example according to the classification. For example, an event score is propagated to all of the events of a certain process based on the scoring that is given to one of the events of the certain process. Optionally, event scores are accumulated, for example an event may inherit event scores from one or more parent events and may pass on its event score children events. Optionally, event scores are used for calculating a general score of a malicious threat related to the respective events. For example, scoring may be performed as follows:

If Event class is "Registry" and the event Operation is "RegSetValue" and the event path is "\System\CurrentControlSet\Control . . . " then label then classify this event as "AutoStart" and apply a scoring function Scores and classifications are propagated and attached to the entity representing the process emitting the specific event.

Optionally, as shown at 109, a deterministic process score is given to each group of events representing a common process. The score is optionally aggregated, for example passed on from children process(es) to a parent process that adds their scores.

Optionally, a process score is determined according to the respective event scores. In such embodiments, the process score is a sum of the respective event scores and optionally a current process score and optionally children score(s). Optionally, a deterministic process score is given to each host related activity.

Figure 6:
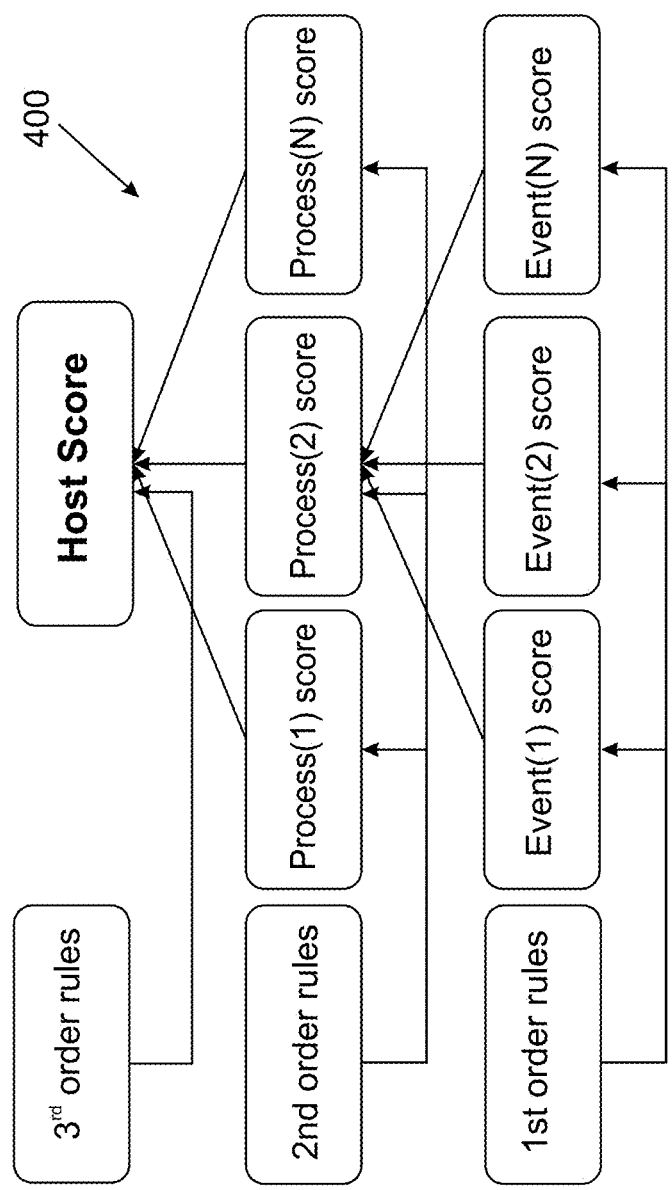
FIG. 6 is a flowchart of a process of score propagation, according to some embodiments of the present invention.

In addition, as shown at 121, scores are accumulated to provide a current status score to the status of the respective of the computing device. For example, reference is now made to FIG. 6, which is a flowchart of a process of score propagation, according to some embodiments of the present invention. In this process, event scores are accumulated for a related process, process scores are accumulated for a related host activity, and host activities are accumulated for a certain environment process. The accumulation proceeds until reaching a threshold indicating a threat. The score may by a deterministic score, which optionally vary, for example between 0 and 1000. The score maybe a statistical score reflecting an overall status of an event, a process and/or a hosting terminal, and/or an environment activity. For example, a score may be a certain percentage of an overall deterministic score and certain percentage of a statistical score. Optionally, different scores may receive different tags, for example color tags. For instance, 0-20% of a certain score is indicated with green, 20-50% of the certain score is indicated with yellow, 50-90% of the certain score is indicated with orange and 90-100% of the certain score is indicated with red. The certain score may not be the maximum score as malicious patterns may lead to a score above the certain score for example beyond 100% of the certain score.

As shown at 122, this score may be later combined with similarity score(s) given to the rule compliance status dataset. The combined score may be used for malware detection and/or prevention, as shown at 119.

Figure 7:
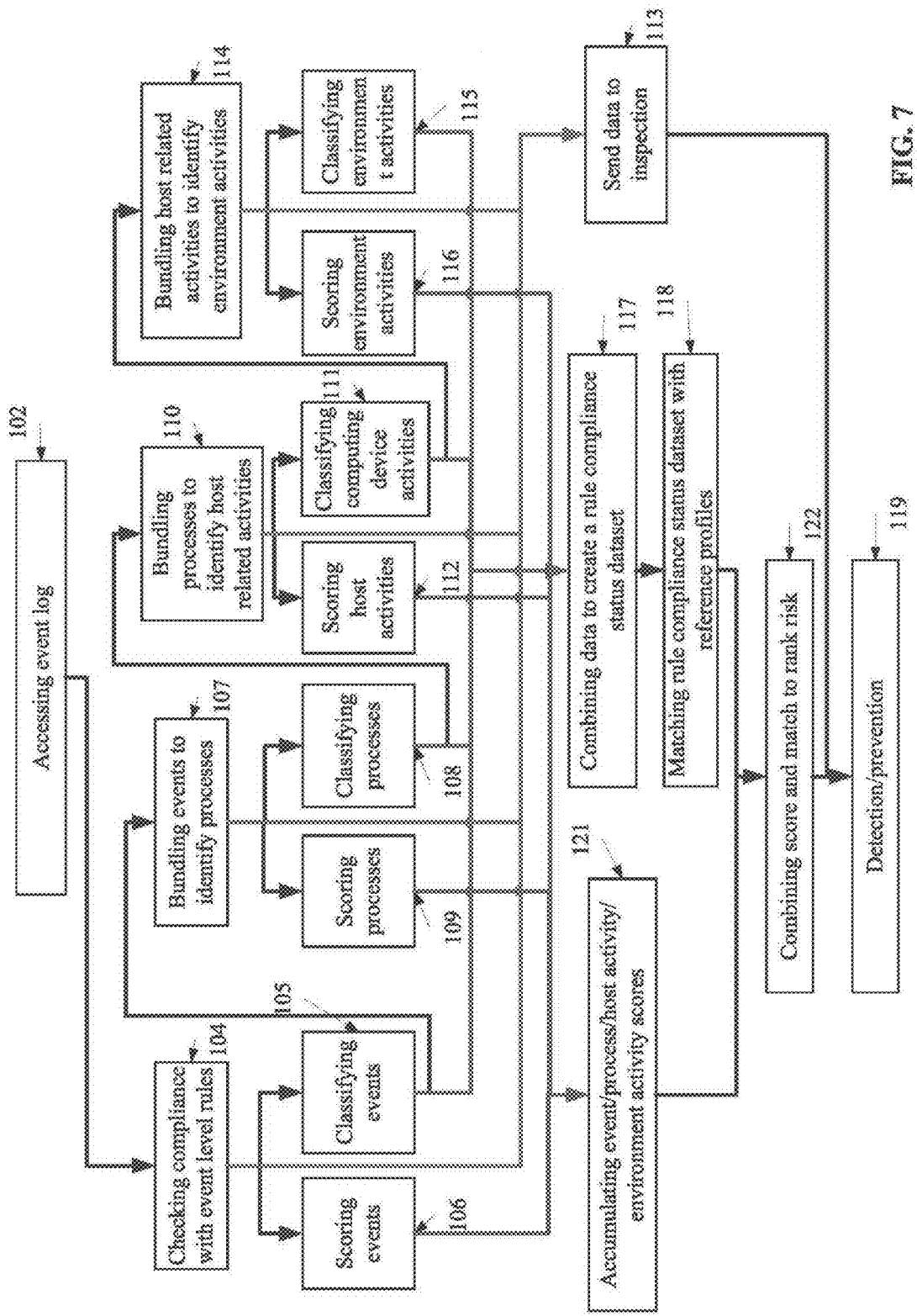
FIG. 7 is a flowchart of a process of detecting and/or preventing malwares, according to some embodiments of the present invention.

According to some embodiments of the present invention, data is extracted from events, processes, host activities, and/or environment activities which match certain patterns and/or malware and/or normal operation profiles and sent for inspection, for example from the malicious threat monitoring modules 203 to the central unit 202. For example, reference is now made to FIG. 7, which is a flowchart of a process of detecting and/or preventing malwares, according to some embodiments of the present invention.

Figure 5:
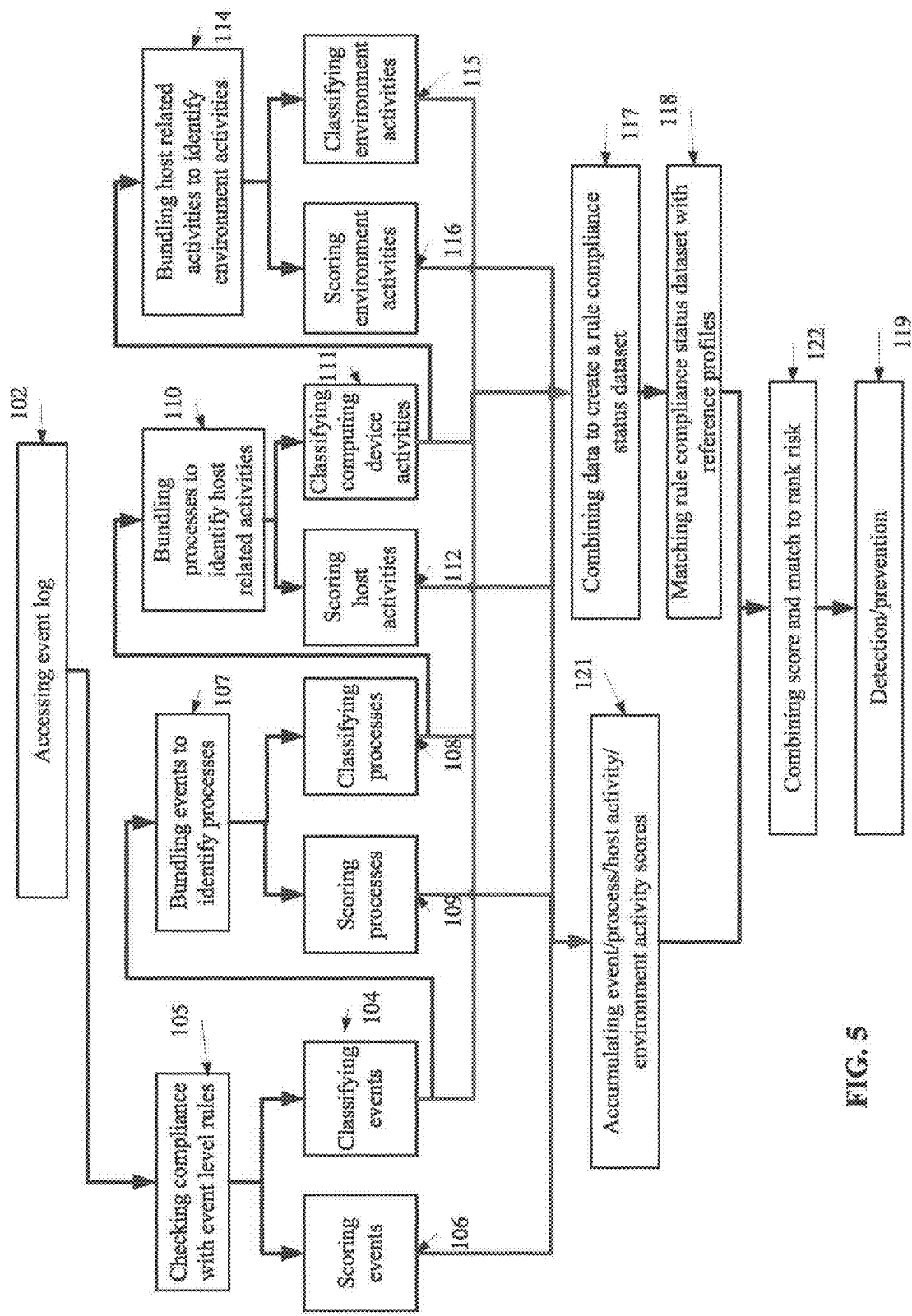
FIG. 5 is a flowchart of a process of detecting and/or preventing malwares based on scores of events, processes, host activities and/or environment activities, according to some embodiments of the present invention.

The process is as depicted in FIG. 5; however, as shown at 113, data extracted from events, processes, host activities, and/or environment activities is inspected. Based on the inspection, malwares may be detected and/or prevented as described herein.

Optionally, as shown at 113, the data is forwarded to the central unit 202 for probing. The forwarding may be instructed as follows:

If counters(classification1, classification2, classification3)
  then classify("tag1") and runProb("prob name");
skip else reapply Inspection is optionally performed by a probing component that is part of the malicious threat monitoring module 203 installed on the respective hosting computing device 201, for example an executed predefined and/or real time generated probing scripts and/or probing tools. Optionally, code snippets, utilities and/or other pieces of software are installed sent to the computing device 201 and deliver the host related activities data. The central unit 202 may instruct an execution of a specific script that exists on the hosting computing device 201 (e.g. part of the malicious threat monitoring module 203) and forwards respective result(s) to the central unit 202. The central unit 202 analyses the host related activities data and optionally stores the host related activities and/or the results in a respective memory.

Optionally, central unit operations are performed by the malicious threat monitoring modules 203, which are optionally updated from time to time.

Exemplary list of probing functions, which are optionally executed on the hosting computing device 201 for extracting host related activities data and forwarding it to the hosting computing device 201, are provided herein:

| | |
|---|---|
| 1 | Verify digital signature of the file |
| 2 | Parse and make a baseline list of autoruns locations in an unmalicious event dataset. Then make diff when asked from the server, find new entries. |
| 3 | Parse the handles and store them per process. The handles list should be a part of the unmalicious event dataset. When the probe runs by the request from the server, then compare the list and find the differences (new handles) |
| 4 | Extracts readable strings from the file |
| 5 | Fuzzy hashing of the file |

These probing functions provide for example a forensic memory, OS kernel analysis that allows identifying various anomalies and/or known malware operations.

Additionally or alternatively, probing functions may be used to analyze memory dump files of the hosting computing device 203 and to detect accordingly footprints of a malware that changes OS behavior, for example of a rootkit type malware.

Exemplary list of such probing functions is provided herein:

| | |
|---|---|
| V 1 | Detect IAT, EAT, and Inline hooks in process or kernel memory. |
| 2 | Find EPROCESS objects using pool tag scanning |
| 3 | Print DLLs in unlinked/hidden processes |
| 4 | Print list of open handles for each process |
| 5 | Print the SIDs owning each process |
| 6 | Enumerate imported and exported functions from PE files |
| 7 | Extract a process's executable, preserving slack space |
| 8 | Walk the VAD tree |
| 9 | Print loaded kernel drivers |
| 10 | Print the Native and GDI System Service Descriptor Tables |
| 11 | Scan physical memory for DRIVER_OBJECT objects |
| 12 | Scan physical memory for FILE_OBJECT objects |
| 13 | Scan physical memory for KMUTANT objects |
| 14 | Scan physical memory for ETHREAD objects |
| 15 | Extract injected DLLs, injected code, unpacker stubs, API hook trampolines |
| 16 | Detect unlinked DLLs by cross-referencing memory mapped files |
| 17 | Scan for calls to imported functions. |
| 18 | Dumps the Interrupt Descriptor Table. Checks for inline API hooks of all IDT entries. |
| 19 | Dumps the Global Descriptor Table. Prints a disassembly for malicious 32-bit call gates. |
| 20 | Investigate threads using various heuristics |
| 21 | Prints kernel callbacks of the various types |
| 22 | Print the 28 IRP handlers for each driver object |
| 23 | Detect hidden processes by cross-referencing with various sources of process listings |
| 24 | Explore kernel timers (KTIMER) and DPCs (Deferred Procedure Calls) |

According to some embodiments of the present invention, the system 200 is a learning system and/or an evolving system. Optionally, the database of malware and/or normal operation profiles, rules and/or probing functions is updated, for example according to deterministic and/or statistical models. A process of detecting and/or preventing malwares which updates unmalicious events and various profiles for future uses, according to some embodiments of the present invention, is described in FIG. 8.

The process is as depicted in FIG. 5; however, as shown at 123 and described below, data pertaining to unmalicious events and profiles is gathered to update the to database(s) according to which events, processes and host and environment activities are monitored.

For example, a normal operation and/or a malware profile are updated with unrecorded or documented behaviors. This may be done in event, process, host, and/or environment levels. Optionally, new rules are generated and added in run time. The rules may be forwarded to the malicious threat monitoring modules 203 and/or stored in the central unit 202. In such embodiments, rule compliance status datasets, for example vectors, are recalibrated to include compliance or noncompliance with the new rules in real time (as described above, the event log may be iteratively analyzed according to the rules).

Optionally, a deterministic learning mechanism is implemented to purge events, processes, and/or activities. Purged events and/or events of certain processes and/or activities may be added to the unmalicious event dataset. Optionally, when malware and/or normal operations, which are identified in one of the computing devices, the respective rule compliance status dataset is recorded and optionally clustered with other rule compliance status datasets of other computing devices. The clustered data may be used to update and/or create malware and/or normal operation profiles. In such a manner, rule compliance status datasets may be analyzed statistically according to actual events, processes, host activities and/or environmental level data. The updating may be continually performed in run time.

In case one or more members of a cluster of rule compliance status datasets are identified as malicious, a new malware profile is identified, optionally after being verified by a statistical model. The malware profile may be added to an existing malware family and/or tagged as a new specimen based on a proximity analysis.

Optionally, when a new profile, for example malware profile, is identified, the central unit 202 sends update messages to all malicious threat monitoring modules 203 for performing the matching between a current rule compliance status dataset and the new malware profile.

Optionally, the learning is performed automatically according to statistical and deterministic algorithms and/or manually where new profiles are acknowledged by an administrator. Optionally, the system has no learning mechanism. Optionally, the learning is performed by a central learning module that monitors the profiles of the monitored hosting terminals.

According to some embodiments of the present invention, the processes may be purged and optionally their process score may be reduced if some conditions are met. For example, if no malware indicative events are identified for a period since the process is detected (the period may be predefined and selected according to the operating system and/or the type of the hosting computing device), the probability of a respective rule compliance status dataset, for example a vector, of being indicative of a malware activity, and/or the classification of the respective rule compliance status dataset.

Optionally, events of a checked process may be purged and/or marked as unmalicious events based on the above process purging and/or process score reduction.

Optionally, events are marked as unmalicious events if no malware operations are detected for a certain period, if respective behavior is identified in more than a certain percentage of monitored hosting terminals, and/or a respective deterministic and/or statistical score does not exceed a certain level.

Optionally, a purging of an environment activity may be used to purge hosting terminal activity. Optionally, a purging of a hosting terminal activity may be used to purge a process. Optionally, a purging of a process may be used to purge events.

Figure 8:
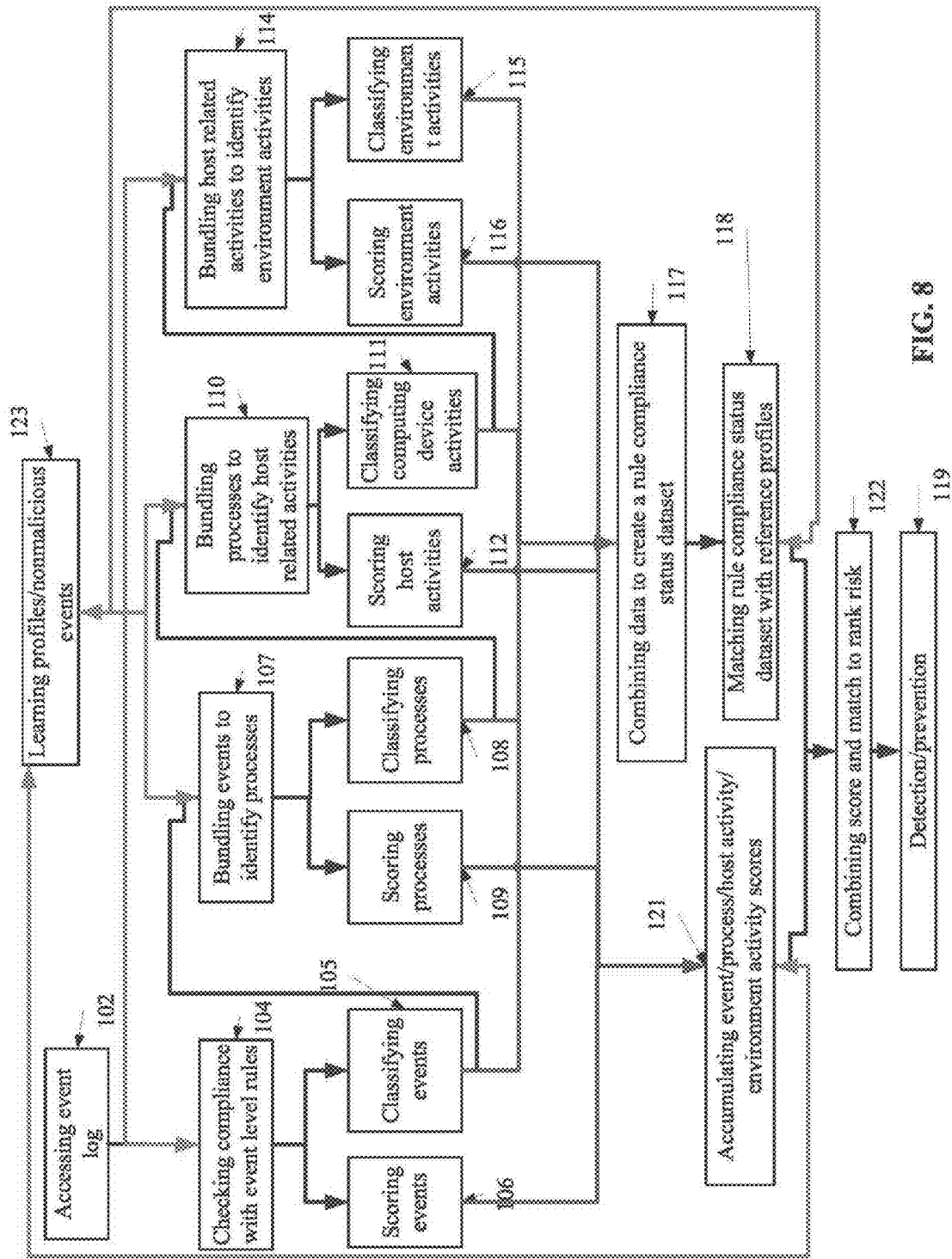
FIG. 8 is a flowchart of a process of detecting and/or preventing malwares which updates unmalicious events and various profiles for future uses, according to some embodiments of the present invention.

Reference is now made to an unmalicious event learning mechanism set to update the unmalicious event dataset, for example based on data received in the respective flows depicted in FIG. 8. As described above, the unmalicious event dataset may be updated according to data gathered during the operation of one or more computing devices. The process of learning may be performed according to deterministic and/or statistic models. Optionally, the unmalicious event dataset is updated with a behavior a respective malicious threat monitoring module 203 and/or central unit 202 encountered for the first time, for example a set of events.

Optionally, a deterministic learning mechanism is used. In such embodiments, an event, a process, and/or an activity, which are identified as complying with certain rule(s) according to high score(s), are sent to a purge process during which it is decided whether they can be purged. One of the outcomes of this action is an update to the unmalicious event log. In such embodiments, respective events are not scored and/or classified but rather filtered as shown at 101.

Optionally, a deterministic learning mechanism is used. In such embodiments, the deterministic mechanism bunds events constantly. In case such one bundle or few of them turn to be malicious, it can be defined as a new attack vector. Optionally, if this specific classification is verified by a statistical model, meaning the rule compliance status dataset of this "new attack vector" is closely related (proximity wise) to a profile indicative of a rule compliance status dataset generated when one of the malware families it could mean that a new family/specimen of a malware was detected. In this case the "new attack vector" may be sent for manual inspection. The manual inspection may dispatch a new profile and optionally disseminate the new profile to the modules.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the to reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a module, central unit, and a network is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments to and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification to are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method for protecting a computing device from one or more malicious threats, comprising executing, on a processor the steps of:
   executing at least one malicious code by a computing device;
   monitoring a plurality of events occurring on said computing device in run time, a plurality of processes executed on said computing device in run time, and a plurality of host activities of said computing device in run time, wherein said plurality of processes are identified by correlating among said plurality of events, wherein said plurality of host activities are identified by correlating among said plurality of processes;
   identifying a compliance of at least some of said plurality of events, of at least some of said plurality of processes, and of at least some of said plurality of host activities with a plurality of rules;
   generating a status dataset generated according to said compliance, wherein said status dataset comprises compliance indications of said compliance;
   identifying a match between said compliance indications of said status dataset and at least one of a plurality of reference profiles each indicative of a computing device operation under a malicious threat activity; and
   detecting a malicious threat related to said at least one malicious code according to said match.

2. The method of claim 1, further comprising scoring at least some of said plurality of events, at least some of said plurality of processes, and at least some of said plurality of host activities and detecting said malicious threat according to a combination of an outcome of said scoring and said match.

3. The method of claim 1, wherein said monitoring comprises normalizing said plurality of events.

4. The method of claim 1, wherein said monitoring comprises filtering a group of unmalicious events from said plurality of events according to unmalicious event dataset comprising a plurality of event profiles generated according to a statistical analysis of a plurality of event logs recorded in a plurality of computing devices.

5. The method of claim 1, wherein said identifying a compliance comprises identifying an event compliance of said plurality of events with a plurality of event level rules, a process compliance of said plurality of processes with a plurality of process level rules, and a host activity compliance of said plurality of host activities with a plurality of host activity level rules.

6. The method of claim 5, wherein said generating comprises combining between data indicative of said event compliance, data indicative of said process compliance and data indicative of said host activity compliance.

7. The method of claim 5, wherein said event compliance is performed by analyzing a compliance of a sequence from said plurality of events according to at least one of said plurality of event level rules.

8. The method of claim 1, wherein said monitoring comprises classifying said plurality of events and counting said plurality of events in light of said classification, said compliance is checked according to said counting.

9. The method of claim 1, wherein said generating comprises calculating a similarity score of said match, said detecting is performed according to said similarity score.

10. The method of claim 9, further comprising scoring a threat level of at least some of said plurality of host activities; said detecting is performed according to a combination of said scoring and said similarity score.

11. The method of claim 1, wherein said status dataset is a binary dataset wherein each field is indicative of compliance or noncompliance with another of said plurality of rules.

12. The method of claim 1, wherein said plurality of events comprises a plurality of kernel level events.

13. The method of claim 1, wherein monitoring comprises documenting said plurality of events in an event log, said plurality of host activities is generated from an analysis of said event log.

14. The method of claim 1, further comprising iteratively repeating said method to update said status dataset during a period of at least a month.

15. The method of claim 1, wherein said detecting comprises outputting a notification according to said match.

16. A non-transitory computer readable medium comprising computer executable instructions adapted to perform the method of claim 1.

17. The method of claim 1, further comprising classifying at least one member of a group consisting of: said plurality of events, said plurality of processes, and said plurality of host activities, sending data pertaining to said at least one member to inspection by a central unit.

18. A computer-implemented method for protecting a computer device from one or more malicious threats, comprising executing on a processor the steps of:
- executing at least one malicious code by a computing device;
- monitoring a plurality of events occurring on said computing device in run time;
- calculating an event score indicative of a threat level to each of at least some of said plurality of events;
- identifying a plurality of processes executed on said computing device each related to a group of events from said plurality of events and calculating a process score to each said process by aggregating respective event scores of a respective said group of events;
- identifying a plurality of host activities of said computing device each related to a group of processes from said plurality of events and scoring each said host activity by aggregating respective process scores of a respective said group of processes; and
- detecting a malware related to said at least one malicious code if at least one of said event scores, process scores, and data activity scores exceeds a respective score threshold.

19. The method of claim 18, further comprising identifying a plurality of environment activities of a computing device environment comprising said computing device, each said environment activity being related to a group of host activities from a plurality of computing devices in said computing device environment and scoring each said environment activity by aggregating respective host activity scores of a respective said group of host activities.

20. A computer-implemented method of identifying a malware profile, comprising executing on one or more processors a code comprising the following code instructions:
- generating a status dataset for each of a plurality of computing devices in run time, each said status dataset being generated according to a compliance of events, processes, and host activities of one of said plurality of computing devices with a plurality of rules, said events, processes, and host activities being gathered during a period of at least one month, wherein said processes are identified by correlating among said events, wherein said host activities are identified by correlating among said processes, wherein said status dataset comprises compliance indications of said compliance;
- scoring a threat level of each said computing devices in run time according to a classification of at least some of said events, processes, and host activities; and
- extracting a malware profile from respective said respective compliance indications of said status datasets of a group of said plurality of computing devices if a respective said threat level of at least one member of said group is above a threshold.

21. A system for identifying one or more malicious threats, comprising:
- a plurality of monitoring modules installed in a plurality of computing devices, each said monitoring module comprising executable code executed by each of said computing devices for monitoring a plurality of events, a plurality of processes and a plurality of host activities of a respective hosting said computing device in run time, for checking compliance of said plurality of events, said plurality of processes and said plurality of host activities with a plurality of rules, for generating a status dataset comprising compliance indications of said compliance, and for detecting a malicious threat activity according to a match between said compliance indications of said status dataset and at least one of a plurality of reference profiles in a profile repository, wherein said plurality of processes are identified by correlating among said plurality of events, wherein said plurality of host activities are identified by correlating among said plurality of processes; and
- a central unit comprising at least one server further comprising a processor and a memory, which receives, via network, a plurality of status datasets comprising compliance indications of compliance with said plurality of rules including said status dataset from said plurality of monitoring modules and updates said profiles accordingly.

22. The computer-implemented method of claim 20, wherein said code further comprises code instructions for updating said malware profile with unrecorded behavior in at least one of event level, process level, host activity level and environment activity level.

23. The computer-implemented method of claim 20 wherein said code further comprises code instructions for generating new rules in run time;
- adding said new rules to said plurality of rules in run time; and
- recalibrating said compliance indications of said status dataset of each of said plurality of computing devices to include compliance status with said new rules in run time.

* * * * *